(12) United States Patent
Beaver et al.

(10) Patent No.: US 12,153,897 B2
(45) Date of Patent: Nov. 26, 2024

(54) COMBINING UNSUPERVISED AND SEMI-SUPERVISED DEEP CLUSTERING APPROACHES FOR MINING INTENTIONS FROM TEXTS

(71) Applicant: VERINT AMERICAS INC., Alpharetta, GA (US)

(72) Inventors: Ian Beaver, Spokane, WA (US); Xinyu Chen, Spokane, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 498 days.

(21) Appl. No.: 17/605,326

(22) PCT Filed: Sep. 17, 2021

(86) PCT No.: PCT/US2021/050784
§ 371 (c)(1),
(2) Date: Oct. 21, 2021

(87) PCT Pub. No.: WO2022/061057
PCT Pub. Date: Mar. 24, 2022

(65) Prior Publication Data
US 2023/0114897 A1 Apr. 13, 2023

Related U.S. Application Data

(60) Provisional application No. 63/079,793, filed on Sep. 17, 2020.

(51) Int. Cl.
*G06F 40/40* (2020.01)
*G06F 18/2323* (2023.01)
*G06F 40/289* (2020.01)

(52) U.S. Cl.
CPC .......... *G06F 40/40* (2020.01); *G06F 18/2323* (2023.01); *G06F 40/289* (2020.01)

(58) Field of Classification Search
CPC .... G06F 40/40; G06F 18/2323; G06F 40/289; G06F 40/30; G06F 16/355
(Continued)

(56) References Cited

U.S. PATENT DOCUMENTS

2020/0106881 A1* 4/2020 Beaver .................... G06F 40/35
2021/0056445 A1* 2/2021 Wu .......................... G06N 5/04

FOREIGN PATENT DOCUMENTS

EP          3633536          4/2020

OTHER PUBLICATIONS

Aggarwal, C.C., et al., "A Survey of Text Clustering Algorithms," Chapter 4: Mining Text Data, 2012, pp. 77-128.
(Continued)

*Primary Examiner* — Thierry L Pham
(74) *Attorney, Agent, or Firm* — Meunier Carlin & Curfman LLC

(57) ABSTRACT

An analysis platform combines unsupervised and semi-supervised approaches to quickly surface and organize relevant user intentions from conversational text (e.g., from natural language inputs). An unsupervised and semi-supervised pipeline is provided that integrates the fine-tuning of high performing language models via a language models fine-tuning module, a distributed KNN-graph building method via a KNN-graph building module, and community detection techniques for mining the intentions and topics from texts via an intention mining module.

19 Claims, 6 Drawing Sheets

(58) Field of Classification Search
USPC .......................................................... 704/9
See application file for complete search history.

(56) References Cited

OTHER PUBLICATIONS

Arthur, D., et al., k-means++: The Advantages of Careful Seeding, Technical report, Stanford, 2006, 9 pages.
Beaver, I., et al., "Automated Conversation Review to Surface Virtual Assistant Misunderstandings: Reducing Cost and Increasing Privacy," Proceedings of the 32$^{nd}$ Innovative Applications of Artificial Intelligence Conference (IAAI-20), vol. 34, 2020, pp. 13140-13147.
Blei, D.M., "Probabilistic Topic Models," Communications of the ACM, vol. 55, No. 4, 2012, pp. 77-84.
Blondel, V.D., et al., "Fast unfolding of communities in large networks," Journal of Statistical Mechanics: Theory and Experiment, vol. 10, 2008, 12 pages.
Cer, D., et al., "SemEval-2017 Task 1: Semantic Textual Similarity Multilingual and Cross-lingual Focused Evaluation," Proceedings of the 11th International Workshop on Semantic Evaluations, Association for Computational Linguistics, 2017, 14 pages.
Chronopoulou, A., et al., "An Embarrassingly Simple Approach for Transfer Learning from Pretrained Language Models," Proceedings of the NAACL-HLT 2019, Association for Computational Linguistics, 2019, pp. 2089-2095.
Dalcin, L.D., et al., "Parallel distributed computing using Python," Advances in Water Resources, vol. 34, No. 9, 2011, pp. 1124-1139.
Dernoncourt, F., et al., "PubMed 200k RCT: A Dataset for Sequential Sentence Classification in Medical Abstracts," Proceedings of the 8$^{th}$ International Joing Conference on Natural Language Processing, AFNLP, 2017, pp. 308-313.
Devlin, J., et al., "Bert: Pre-training of Deep Bidirectional Transformers for Language Understanding," Proceedings of NAACL-HLT, 2019, pp. 4171-4186.
Greene, D., et al., "Practical Solutions to the Problem of Diagonal Dominance in Kernel Document Clustering," Proceedings of the 23rd International Conference on Machine Learning, 2006, pp. 377-384.
Johnson, J., et al., "Billion-scale similarity search with GPUs," IEEE Transactions on Big Data, 2019, 12 pages.
Lang, K., "NewsWeeder: Learning to Filter Netnews," Proceedings of the 12$^{th}$ International Conference on Machine Learning, 1995, pp. 331-339.
Lewis, D.D., et al., "RCV1: A New Benchmark Collection for Text Categorization Research," Journal of Machine Learning Research, vol. 5, 2004, pp. 361-397.
Li, X., et al., "Semi-Supervised Clustering with Deep Metric Learning and Graph Embedding," Computer Science, vol. 23, No. 2, 2020, pp. 781-798.
Liu, Y., et al., "RoBERTa: A Robustly Optimized BERT Pretraining Approach," 2019, 13 pages.
Loshchilov, I., et al., "Decoupled Weight Decay Regularization," Computer Science, 2017, 18 pages.
Manning, C.D., et al., "An Introduction to Information Retrieval," Cambridge University, 2008, 569 pages.
Peters, M., et al., "Deep contextualized word representations," Proceedings of NAACL-HLT 2018, Association for Computer Linguistics, 2018, pp. 2227-2237.
Peters, M., et al., "To Tune or Not to Tune? Adapting Pretrained Representations to Diverse Tasks," 2019, 8 pages.
Radford, A., et al., "Language Models are Unsupervised Multitask Learners," Open AI Blog, vol. 1, No. 8, 2019, 24 pages.
Ram, A., et al., "Conversational AI: The Science Behind the Alexa Prize," 2018, 18 pages.
Ren, Y., et al., "Semi-supervised deep embedded clustering," Neurocomputing, vol. 325, 2019, pp. 121-130.
Role, F., et al., "CoClust: A 483 Python Package for Co-Clustering," Journal of Statistical Software, vol. 88, Issue 7, 2019, 29 pages.
Śmieja, M., et al., "A Classification-Based Approach to Semi-Supervised Clustering with Pairwise Constraints," Neural Networks, 2020, 22 pages.
Steyvers, M. et al., "Probabilistic Topic Models," Handbook of Latent Semantic Analysis: A Road to Meaning, vol. 427, vol. 7, 2007, pp. 424-440.
Von Luxburg, U., "A Tutorial on Spectral Clustering," Statistics and Computing, vol. 17, No. 4, 2007, pp. 395-416.
Wang, H., et al., "A study of graph-based system for multi-view clustering," Knowledge Based Systems, vol. 163, 2019, pp. 1009-1019.
Wang, Z., et al., "Semi-supervised Clustering for Short Text via Deep Representation Learning," Proceedings of the 20$^{th}$ SIGNLL Conference on Computational Natural Language Learning (CoNLL), 2016, pp. 31-39.
Xie, J., et al., "Unsupervised Deep Embedding for Clustering Analysis," International Conference on Machine Learning, 2016, pp. 478-487.
Yang, L., et al., "Deep Clustering by Gaussian Mixture Variational Autoencoders with Graph Embedding," Proceedings of the IEEE International Conference on Computer Vision, 2019, pp. 6440-6449.
International Search Report and Written Opinion, dated Dec. 2, 2021, received in connection with corresponding International Patent Application No. PCT/US2021/050784.

* cited by examiner

Algorithm 1 Distributed KNN-Graph Building

1: $X_{local}$ ▷ local chunk of text embedding
2: $P$ ▷ number of MPI ranks
3: $K$ ▷ number of nearest neighbors
4: CurrKNN ← NULL ▷ Save Top-K elements
5: procedure SELECTTOPK(Block,K)
6:   Sort Block ▷ input dot product
7:   Return Top-K indices and values ▷ TmpKNN
8: procedure COMPAREK(CurrKNN,TmpKNN)
9:   CatBlock ← Concat(CurrKNN,TmpKNN)
10:   Sort CatBlock
11:   Return Top-K indices and values ▷ CurrKNN
12: procedure BUILD-LOCAL-KNN($X_{local}$,K)
13:   for step < P do
14:     Broadcast $X_{step}$
15:     Block ← $X_{local} \cdot X_{step}^T$ ▷ dot product
16:     TmpKNN ← SelectTopK(Block,K)
17:     CurrKNN ← CompareK(CurrKNN, TmpKNN)
18:   Edge-List ← Gather(CurrKNN) to MPI $rank_0$
19:   MPI $rank_0$ Outputs KNN Edge-List

COMBINING UNSUPERVISED AND SEMI-SUPERVISED DEEP CLUSTERING APPROACHES FOR MINING INTENTIONS FROM TEXTS

CROSS-REFERENCE TO RELATED APPLICATIONS

This application is the national phase under 35 U.S.C. § 371 of international application number PCT/US2021/050784 filed on Sep. 17, 2021 and claims the benefit of priority to U.S. Provisional Patent Application No. 63/079,793, filed on Sep. 20, 2020, entitled "COMBINING UNSUPERVISED AND SEMI-SUPERVISED DEEP CLUSTERING APPROACHES FOR MINING INTENTIONS FROM TEXTS," the contents of which are hereby incorporated by reference in their entireties.

BACKGROUND

Intelligent Virtual Assistants (IVAs) are becoming more popular in customer service and product support tasks. A process to design and refine IVAs relies on human analysts who are familiar with specific terminology in a given language domain such as transportation or finance to mine customer service texts for latent user intentions, also referred to as intents.

An intent is the interpretation of user input that allows one to formulate the best possible response. It is common for the human analysts to receive a large batch of customer service logs from a company who would like to deploy an IVA to help automate some aspect of customer service. The analysts mine this text data to surface the most common intents and determine which use cases an IVA would be able to easily automate. The analysts then recommend a subset of high value intents to be created for a company-specific IVA implementation to be deployed on a website, mobile application, or phone support line.

Accordingly, a large amount of effort is required by the human analysts.

It is with respect to these and other considerations that the various aspects and embodiments of the present disclosure are presented.

SUMMARY

An analysis platform combines unsupervised and semi-supervised approaches to quickly surface and organize relevant user intentions from conversational text (e.g., from natural language inputs). An unsupervised and semi-supervised pipeline is provided that integrates the fine-tuning of high performing language models via a language models fine-tuning module, a distributed K-nearest neighbor (KNN)-graph building method via a KNN-graph building module, and community detection techniques for mining the intentions and topics from texts via an intention mining module.

In an implementation, a system for mining latent intentions from natural language inputs comprises: a computing device that maintains natural language inputs; and an analysis platform that uses unsupervised and semi-supervised approaches to surface and organize relevant user intentions from the natural language inputs, wherein the analysis platform comprises: a language models fine-tuning module; a K-nearest neighbor (KNN)-graph building module; and a clustering module.

In an implementation, an analysis platform comprises: a language models fine-tuning module that fine-tunes language models; a K-nearest neighbor (KNN)-graph building module that builds a distributed KNN-graph; a clustering module that comprises a K-means clustering technique and a Louvain clustering technique, wherein the clustering module is configured to perform clustering based on whether a number of clusters is known or unknown; and an intention mining module that mines latent intentions from natural language inputs and an output from the clustering module.

In an implementation, a method for mining latent intentions from natural language inputs comprises: receiving language models based on the natural language inputs; fine-tuning the language models; performing clustering using the fine-tuned language models; and determining the latent intentions based on results of the clustering.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 4 shows an implementation of an algorithm useful in mining latent intentions from natural language inputs;

DETAILED DESCRIPTION

Figure 1:
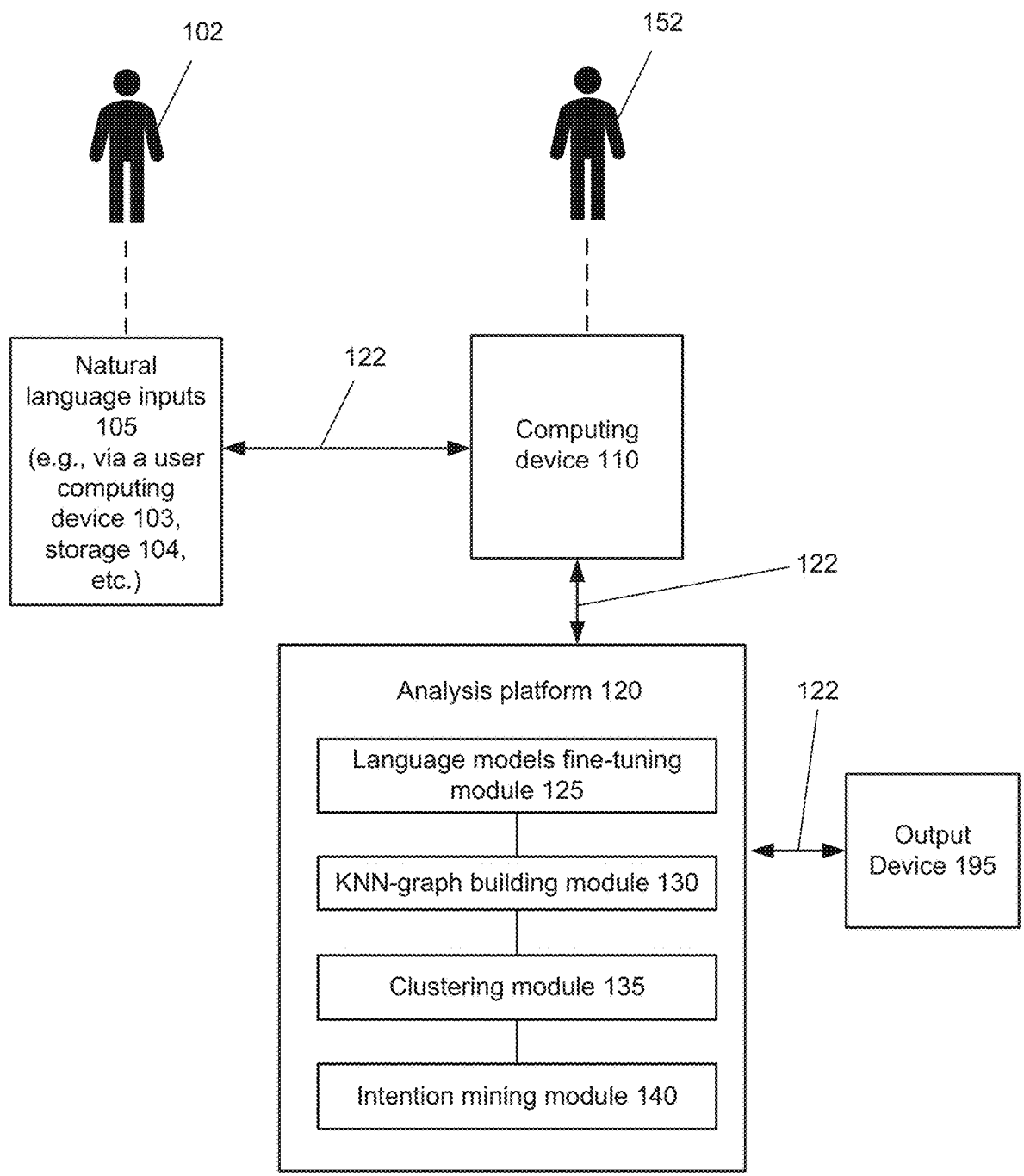
FIG. 1 is an illustration of an exemplary environment for mining latent intentions from natural language inputs.

This description provides examples not intended to limit the scope of the appended claims. The description is not to be taken in a limiting sense, but is made merely for the purpose of illustrating the general principles of the invention, since the scope of the invention is best defined by the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Various inventive features are described herein that can each be used independently of one another or in combination with other features.

FIG. 1 is an illustration of an exemplary environment 100 for mining latent intentions from natural language inputs 105. A user 102, or multiple users 102, may provide natural language inputs 105 to a computing device 110, either directly (e.g., via user computing device 103) or from storage 104 (e.g., a storage device or other memory device). The computing device 110 may be associated with, or otherwise accessible by or to, another user 152, such as an analyst, an administrator, etc.

The environment 100 may comprise an analysis platform 120 as described further herein. The analysis platform 120 may comprise a language models fine-tuning module 125, a K-nearest neighbor (KNN)-graph building module 130, a clustering module 135, and an intention mining module 140. The analysis platform 120 may provide output to the computing device 110 and/or another output device 195, depending on the implementation. In some implementations, the analysis platform 120 may be comprised within the computing device 110 and/or the output device 195.

The user computing device 103, the storage 104, the computing device 110, the analysis platform 120, and/or the output device 195 may be in communication through a network 122 or multiple networks 122. The network(s) 122 may be a variety of network types including the public switched telephone network (PSTN), a cellular telephone network, and a packet switched network (e.g., the Internet). Although only user computing device 103, one storage 104, one computing device 110, one analysis platform 120, and one output device 195 are shown in FIG. 1, there is no limit to the number of user computing devices 103, storages 104, computing devices 110, analysis platforms 120, and output devices 195 that may be supported.

Figure 7:
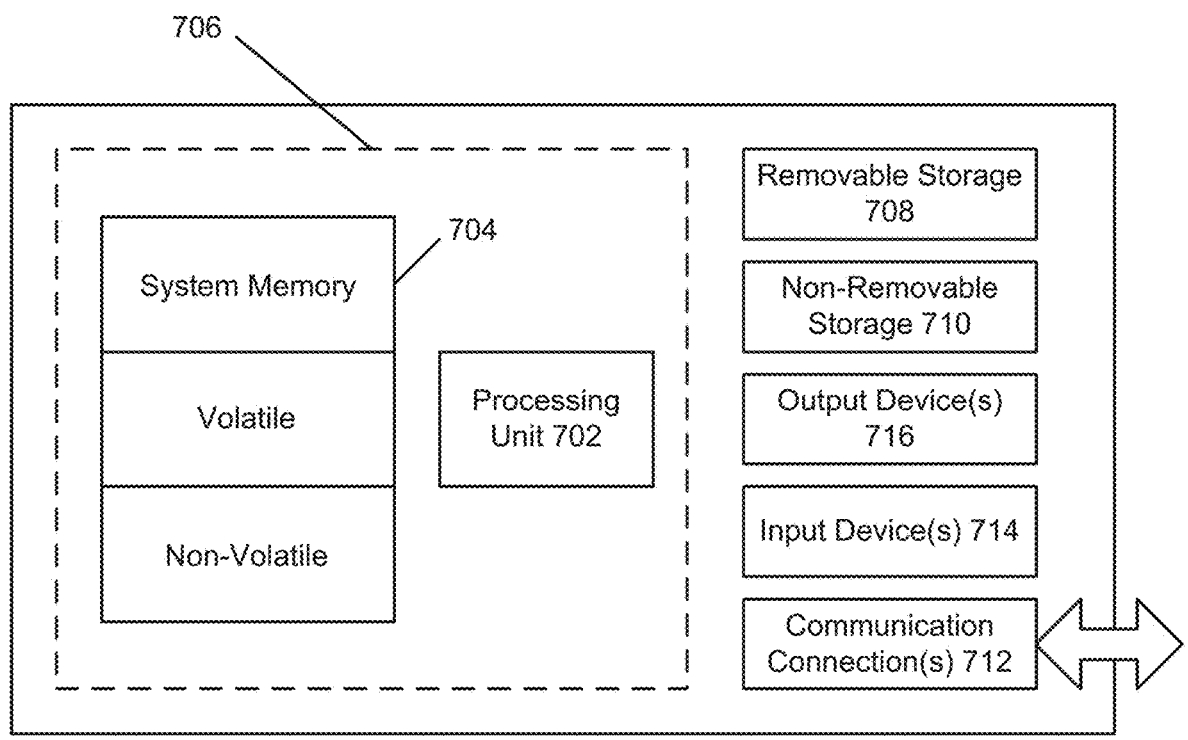
FIG. 7 shows an exemplary computing environment in which example embodiments and aspects may be implemented.

The user computing device 103, the storage 104, the computing device 110, the analysis platform 120, and the output device 195 may be implemented using a variety of computing devices such as smartphones, desktop computers, laptop computers, tablets, set top boxes, etc. Other types of computing devices may be supported. A suitable computing device is illustrated in FIG. 7 as the computing device 700.

Mining the latent intentions from a large volume of natural language inputs 105 is critical in designing and refining Intelligent Virtual Assistants (IVAs) for customer service and sales support. The analysis platform 120 combines unsupervised and semi-supervised approaches to quickly surface and organize relevant user intentions from conversational text (e.g., from the natural language inputs 105). For the initial exploration of data, an unsupervised and semi-supervised pipeline (e.g., the pipeline 200 of FIG. 2) is provided that integrates the fine-tuning of high performing language models via the language models fine-tuning module 125, a distributed KNN-graph building method via a KNN-graph building module 130, and community detection techniques for mining the intentions and topics from texts via an intention mining module 140.

The fine-tuning operation is beneficial because pre-trained language models cannot encode texts to efficiently surface particular clustering structures when the target texts are from an unseen domain or the clustering task is not to group by similar topics. Two different clustering techniques are contemplated using the clustering module 135: one where the number of clusters is predetermined (e.g., specified by an analyst) (K-means) and one where the number of clusters is detected automatically (Louvain) with comparable clustering quality but at the expense of additional computation time. Although example clustering techniques and algorithms herein are described with respect to K-means and Louvain, this is not intended to be limiting, as any appropriate technique(s) and/or algorithm(s) may be used depending on the implementation. In some implementations, as described further herein, a clustering method is used that requires the clusters to be known ahead of time, such as K-means, and a graph-based algorithm that does not, such as Louvain, for example.

The analysis platform 120 is a powerful language classification tool that helps data analysts to review and organize large volumes of unlabeled conversational text inputs into various intents. The analysis platform 120 is flexible enough to support multiple text mining tasks with high quality results, improving the performance of analysts and reducing the time it takes to surface intentions from customer service data, thereby reducing the time it takes to build and deploy IVAs in new domains.

There are three challenges in the application of text clustering methods to IVA and customer service textual inputs.

A first challenge is the representation of text data. Because the lengths of conversation input texts are often short, directly using a binary representation (Bag of Word) or weighted frequencies of words (TF-IDF) for text data leads to the lexical sparsity issue and these representations generally produce poor clustering quality. Thus, encode texts to contextualized word representations with language models because they greatly improve the performance of Semantic Textual Similarity (STS) tasks, where the length of STS sentences are close to the length of IVAs' text inputs.

A second challenge is the desired grouping of texts for describing user intentions may be different from those learnt by fully unsupervised approaches. Language models are pre-trained to maximize the joint probabilities of symbols and words within text sequences. These joint probabilities resemble the definition of topics in the topic modeling task, i.e., a topic is a probability distribution over words. Thus, unless given further guidance, the contextualized text representations from pre-trained language models are more suited for finding latent topic clusters than with finding other clustering tasks.

A third challenge is the choice of downstream-clustering algorithms. Often the true number of clusters is unknown, so clustering methods that require the true number of clusters may get sub-optimal results when given an inaccurate number of clusters. The analysis platform described herein is configurable to use K-means or the Louvain algorithm depending on whether or not the desired cluster number is known by the analyst beforehand.

These challenges are solved by the unsupervised and semi-supervised pipeline described herein. The pipeline (e.g., the pipeline 200) integrates the fine-tuning of high performing language models, building KNN graphs with a parallel computing method, and applying community detection techniques and is flexible and configurable based on what is already known of the data.

The dimensionality of traditional text representation is large, but the underlying text data is sparse. This makes text clustering a very challenging task. Using language models and deep contextualized representations is promising in many natural language processing tasks. However, some task-specific guidance is useful to adapt language models to a novel domain or to particular downstream tasks. For a pipeline for semi-supervised text clustering tasks, a method utilizes a small number of labeled samples to fine-tune pre-trained language models. This fine-tuning operation adapts the language models to produce task-specific contextualized representations, improving the performance of downstream text clustering tasks.

Text clustering is a fundamental task for applications of topic identification, information extraction, outlier detection, document organization and classification, etc. A challenge in text clustering is to find a clustering-friendly representation of text data. As clustering algorithms are predominately built on measurement of distance between points in a feature space, choice of text representation is critical.

Further to the above, directly using a binary representation (Bag of Word) or weighted frequencies of words (TF-IDF) produces very high dimension representations for text data. This representation generally does not perform well for clustering text data.

Another challenge is to clearly set the intention for clustering tasks. This problem is often overlooked in previous text clustering literature and it motivates a semi-supervised approach.

Language models have shown they can learn highly transferable and task-agnostic features of language. The contextualized word representations they produce for downstream classification or regression algorithms have helped to achieve state-of-art performance. However, when examining the loss functions that language models are pre-trained for, it is observed that they aim to maximize the joint probabilities of symbols and words within text sequences either from different directions (GPT-2, ELMo), using masking strategies (BERT, RoBERTa), or predict entire next sentences (SBERT). These loss functions resemble the definition of topics in the topic modeling task, i.e., a topic is a probability distribution over words. Thus, that unless given further guidance, the contextualized text representations from pre-trained language models are more suited for finding latent topic clusters than with finding other clustering intentions.

Fine-tuning language models is not only beneficial but also necessary to address the challenges mentioned above.

A semi-supervised pipeline uses a small amount of labeled samples to fine-tune existing language models. This operation helps the language models to create task-specific text representations and greatly improves the downstream clustering quality.

Figure 2:
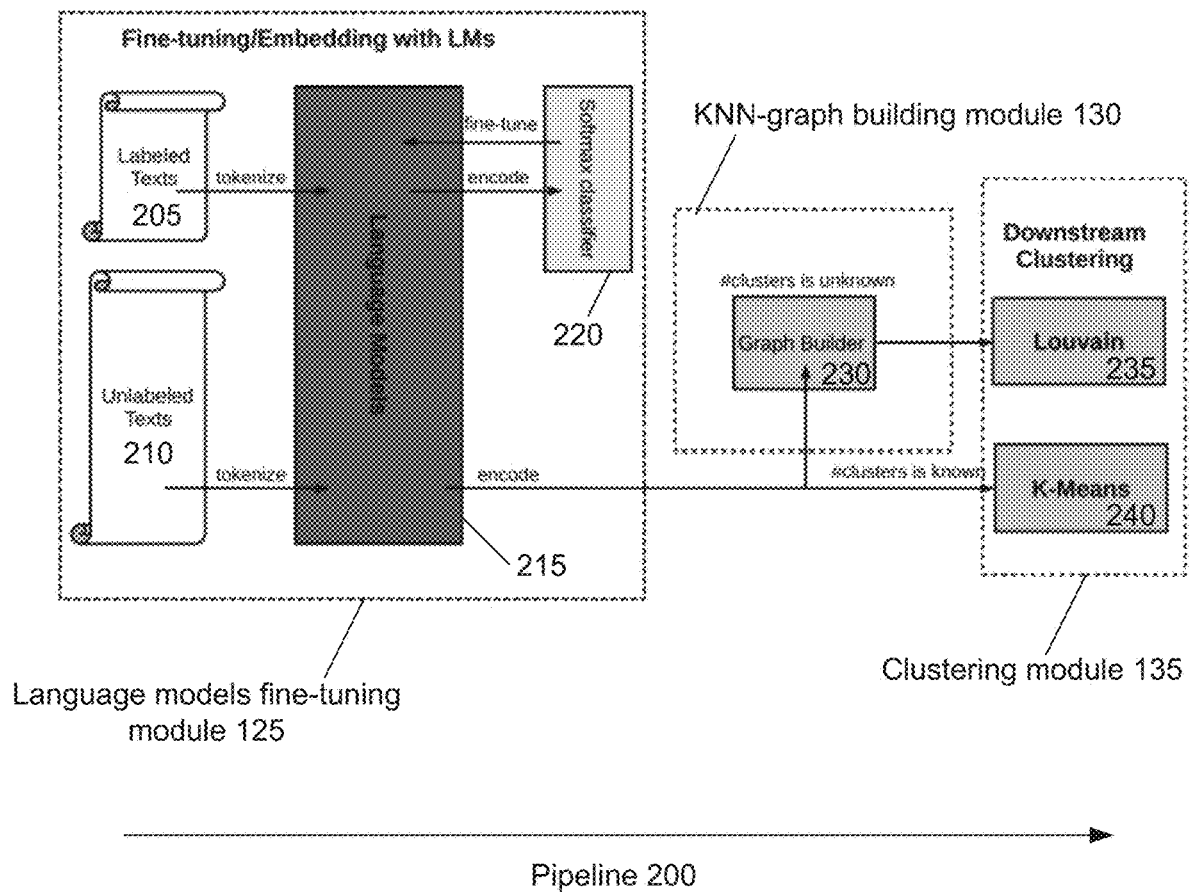
FIG. 2 is an illustration of an implementation of an analysis platform with a semi-supervised pipeline for mining intentions from texts.
Figure 3:
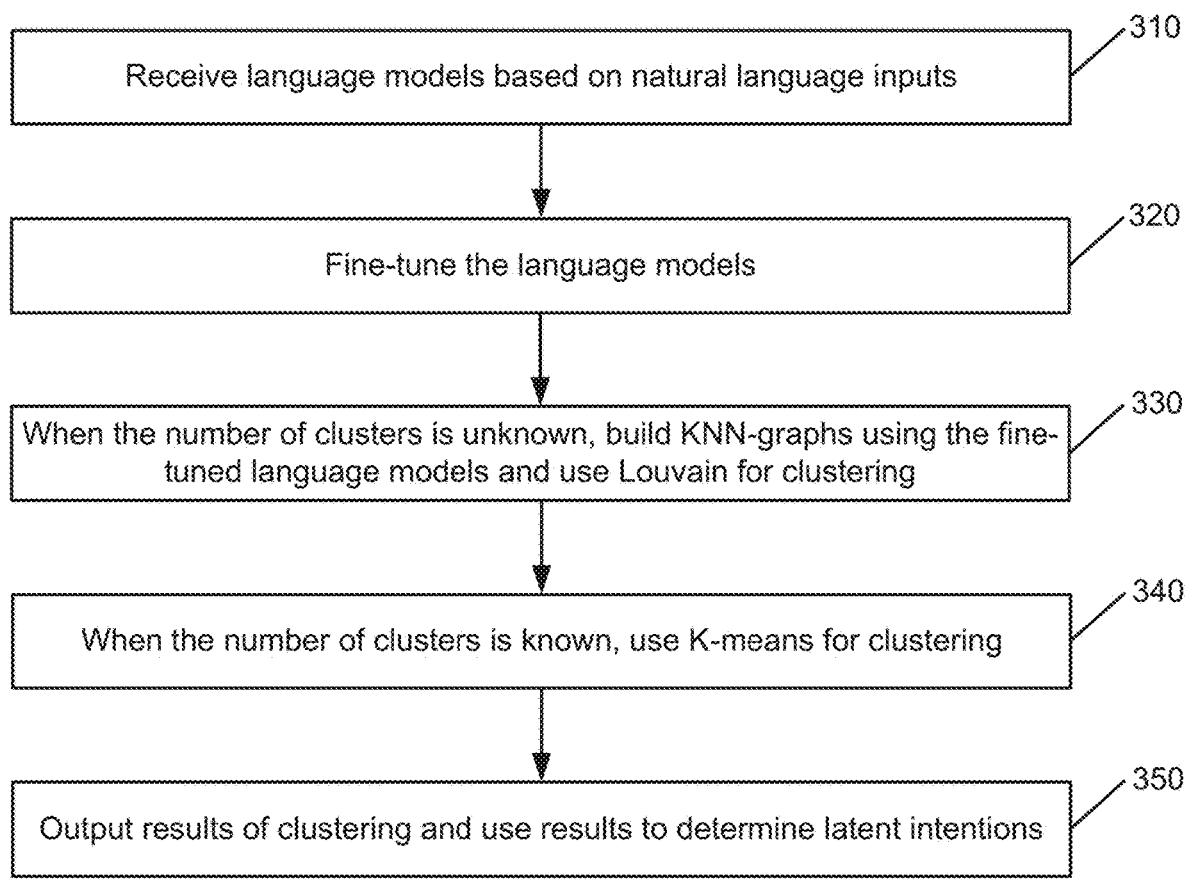
FIG. 3 is an operational flow of an implementation of a method for mining latent intentions from natural language inputs.

FIG. 2 is an illustration of an implementation of an analysis platform, such as the analysis platform 120, with a semi-supervised pipeline 200 for mining intentions from texts. FIG. 3 is an operational flow of an implementation of a method 300 for mining latent intentions from natural language inputs.

Regarding a pipeline implementation, FIG. 2 shows the three components of a pipeline 200 for flexible text clustering. The pipeline 200 starts with language models fine-tuning module 125 configured to perform the fine-tuning and embedding with language models. The second component is an optional distributed KNN-graph builder 230 (comprised within the KNN-graph building module 130) for a Louvain algorithmic technique when the true number of clusters is unknown. The last component in the pipeline shown is a downstream clustering module comprising the downstream clustering algorithm, i.e., K-means or Louvain, in the clustering module 135.

At 310, language models based on natural language inputs are received. The language models fine-tuning module 125 receives or otherwise maintains labeled texts 205 and unlabeled texts 210. The labeled texts 205 and the unlabeled texts 210 are tokenized into language models 215.

At 320, the language models are fine-tuned. The language models 215 are encoded and provided to a softmax classifier 220 which fine-tunes the language models 215.

The fine-tuning/embedding with language models module has a mean pooling layer on top of a selected language model to get the text representations. In the initial state when no data has been labelled yet, the untuned language model representations are directly used for downstream clustering as a fully unsupervised approach. Once the analyst has provided some small subset of labeled samples, it is possible to fine-tune the language models to their particular task. Regarding fine-tuning and encoding with language model, for fine-tuning the language models, add a mean pooling layer on top of a selected language model to get the text representations. To fine-tune a language model for a particular task, add a linear layer on top of the mean pooling layer. Optimize the cross entropy loss to update the language model's parameters and the linear layer at the same time. After the fine-tuning stage, discard this softmax classifier and use the updated language model and mean pooling to encode text data into dense numeric vector representations. More concretely, the fine-tuned language model encodes documents $D=\{a_1, a_2, \ldots, a_N\}$ to a dense N×d matrix $X=\{x_1, x_2, \ldots, x_N\}$, where N is the total number of articles and d is the width of each numeric vector.

The encoded language models 215 are also provided to the KNN-graph building module 130 and the clustering module 135. The clustering module 135 performs downstream clustering using a Louvain 235 algorithmic technique and/or a K-means 240 algorithmic technique, depending on the implementation and on whether the number of clusters is unknown or known. At 330, when the number of clusters is unknown, KNN-graphs using the fine-tuned language models are built, and Louvain is used for clustering. At 340, when the number of clusters is known, K-means is used for clustering.

More particularly, when the number of clusters is unknown, the language models 215 are provided the KNN-graph building module 130. The KNN-graph building module 130 comprises a graph builder 230 that uses the language models 215 in building KNN-graphs.

Regarding distributed KNN-graph building, if the number of clusters is unknown or not specified by the analyst, use a community detection algorithm to detect the number of clusters in a K-nearest neighbor (KNN) graph. To build KNN-graphs for large datasets, a main challenge is the memory required to store and sort the pairwise similarity matrix. FIG. 4 shows an implementation of an algorithm 400 (Algorithm 1) useful in mining latent intentions from natural language inputs. More particularly, FIG. 4 shows Algorithm 1 which is an outline of an implementation of a distributed method to overcome the memory limitations.

At the beginning, split the above embedded dense matrix into P chunks $X=\{X_1, X_2, \ldots, X_p\}^T$ and distribute them on P MPI processes. Each MPI $rank_i$ owns a local chunk of embedded text representation $X_i=\{x_1, x_2, \ldots\}$ so that the following computations can fit in memory. The whole process takes P steps to complete.

Allocate two empty structures $TmpKNN_i^s$ and $CurrKNN_i^s$ on each MPI $rank_i$ to save the values and indices of top-K elements for each row in $X_i$ at $step_s$. At $step_j$, a chunk of dense matrix $X_j$ is broadcast to all MPI ranks from $rank_j$.

Then on each MPI $rank_i$, compute a block of cosine similarity matrix using the normalized dot product of local chunk and the broadcast chunk, i.e., $C_{ij}=\cos(X_i \cdot X_j^T)$. Sort each row from current block $C_{ij}$ and store the largest K values to $TmpKNN_i^j$. $TmpKNN_i^j$ is compared with previous saved CurrKNNZ[1]. Repeat the above computations in the following steps i+1; i+2; ..., P until computing the local chunk $X_i$ against all the broadcast chunks $X_j$ to save the values and indices of top-K elements for each row to CurrKNN$_t^P$. These indices are gathered to MPI rank$_0$ to construct the edge list of KNN-graph A={$(a_1, a_m), \ldots$}. Each node in A is an article of the original text dataset. Select K=O(log(N)) (N is the total number of text inputs) nearest neighbors to build KNN graphs in some implementations. In some implementations, use K=300 when N≥500,000 and K=150 for smaller datasets).

Although implementations described herein use MPI, it is contemplated that a GPU library may be used instead, in some implementations. For a GPU library implementation, for example, convert a dense vector representations into a KNN-graph, using a e.g., a known faiss library. The faiss library can efficiently provide similarity search and clustering with GPU support. On the compressed-domain, the library is able to construct approximate KNN-graphs for up to 1 billion vectors.

Regarding downstream clustering, use K-means or Louvain depending on if the user specifies the desired number of clusters. The Louvain algorithm can detect hierarchical clustering structures from large networks with millions of nodes and billions of links. Both algorithms can handle volumes of tens of thousands to a million text inputs.

Thus, in a pipeline implementation described herein, two different approaches are employed to use the contextualized representations from language models for text clustering tasks. If the number of ground truth partitions K is given, use K-means for the clustering tasks. When the true number of clusters are unknown or unspecified, use graph-based clustering approach Louvain to detect underlying clusters from the KNN-graph built as described further herein. The Louvain algorithm is scalable to detect communities from networks with millions of nodes. Another advantage of Louvain is that K-means may get sub-optimal results for non-convex problems, while graph-based clustering methods can use the connections between similar nodes to detect clustering structures under this situation.

At 350, the results of the clustering are outputted and the results are used to determine latent intentions. The output of the graph builder 230 is provided to the clustering module 135. The clustering module 135 performs downstream clustering using a Louvain 235 algorithmic technique. The output may be provided to an output device, such as the output device 195 or to another computing device, e.g., the computing device 110 of the user 152.

When the number of clusters is known, the language models 215 are provided the clustering module 135. In this instance, the clustering module 135 performs downstream clustering using a K-means 240 algorithmic technique. The output may be provided to an output device, such as the output device 195 or to another computing device, e.g., the computing device 110 of the user 152.

Thus, a scalable pipeline is provided for semi-supervised text clustering tasks which provides comparable clustering performance whether the number of clusters is known in advance or not. The selection of downstream clustering algorithm depends on the application. When the true number of clusters is known beforehand or it can be estimated by sampling and labelling, then K-means can provide high quality clustering results when paired with current language model encodings. When the true number of clusters is unknown, the Louvain algorithm can provide comparable high quality results. However, to use the Louvain algorithm, first build the k-nearest neighbor similarity graph, which may be non-trivial in size and computation time for very large datasets.

Thus, the analysis platform is a major AI improvement to conventional commercial data exploration and annotation tools used for labeling training data for building IVA intent classifier models. The unsupervised and semi-supervised text clustering pipeline is flexible and provides optimal results with a minimum of user configuration (specify number of clusters or not, provided labeled sample for fine-tuning or not). The pipeline greatly reduces the amount of effort required by the human analysts.

Figures 5, 6:
FIG. 5 is an illustration of aspects of an implementation of an analysis platform.
FIG. 6 is an illustration of aspects of another implementation of an analysis platform.

FIGS. 5 and 6 are illustrations of aspects of implementations of an analysis platform. The analysis platform provides an easy drag and drop interface to help analysts review and organize text inputs in hierarchical intents. Once organized, the labeled data is exported to build and deploy intent classifiers for a live IVA.

FIG. 5 shows an analysis platform workspace 500 where analysts search, filter, and group unlabeled text inputs and assign them to labels.

FIG. 6 shows an analysis platform workspace 600 where the labels are organized into hierarchies. These labeled text inputs are then exported to build intent classifier models for production IVAs. Incorporating text clustering algorithms into the analysis platform can provide recommendations of groupings to analysts to at least partially automate the process of categorization and help analysts to gain a better understanding of the type of language contained in input texts.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for mining latent intentions from natural language inputs is provided. The system includes: a computing device that maintains natural language inputs; and an analysis platform that uses unsupervised and semi-supervised approaches to surface and organize relevant user intentions from the natural language inputs, wherein the analysis platform comprises: a language models fine-tuning module; a K-nearest neighbor (KNN)-graph building module; and a clustering module.

Implementations may include some or all of the following features. The language models fine-tuning module is configured to fine-tune language models based on the natural language inputs. The language models fine-tuning module is configured to tokenize labeled texts and unlabeled texts into language models. The KNN-graph building module is configured to build a distributed KNN-graph. The clustering module comprises a clustering technique that requires a number of clusters to be known ahead of time, and a clustering technique that is graph-based that does not require the number of clusters to be known ahead of time. The clustering module is configured to perform clustering based on whether a number of clusters is known or unknown, wherein when the number of clusters is unknown, then a Louvain clustering technique is used, and when the number of clusters is known, then a K-means clustering technique is used. The clustering module is configured to perform clustering based on whether a number of clusters is predetermined or detected automatically, wherein when the number of clusters is detected automatically, then a Louvain clustering technique is used, and when the number of clusters is predetermined, then a K-means clustering technique is used. The system further comprises an intention mining module. The intention mining module is configured to design and refine Intelligent Virtual Assistants (IVAs) for customer service and sales support. The system further comprises an output device that receives an output from the analysis platform and determines latent intentions using the output.

In an implementation, an analysis platform comprises a language models fine-tuning module that fine-tunes language models; a K-nearest neighbor (KNN)-graph building module that builds a distributed KNN-graph; a clustering module that comprises a K-means clustering technique and a Louvain clustering technique, wherein the clustering module is configured to perform clustering based on whether a number of clusters is known or unknown; and an intention mining module that mines latent intentions from natural language inputs and an output from the clustering module.

Implementations may include some or all of the following features. The language models fine-tuning module fine-tunes language models based on the natural language inputs. The intention mining module is configured to design and refine Intelligent Virtual Assistants (IVAs) for customer service and sales support. When the number of clusters is unknown, then the Louvain clustering technique is used, and when the number of clusters is known, then the K-means clustering technique is used. When the number of clusters is detected automatically, then the Louvain clustering technique is used, and when the number of clusters is predetermined, then the K-means clustering technique is used.

In an implementation, a method for mining latent intentions from natural language inputs is provided. The method includes: receiving language models based on the natural language inputs; fine-tuning the language models; performing clustering using the fine-tuned language models; and determining the latent intentions based on results of the clustering.

Implementations may include some or all of the following features. Fine-tuning the language models comprises encoding the language models and using a softmax classifier to fine-tune the language models. Performing clustering comprises performing clustering based on whether a number of clusters is known or unknown, wherein when the number of clusters is unknown, then a Louvain clustering technique is used, and when the number of clusters is known, then a K-means clustering technique is used. Performing clustering comprises performing clustering based on whether a number of clusters is predetermined or detected automatically, wherein when the number of clusters is detected automatically, then a Louvain clustering technique is used, and when the number of clusters is predetermined, then a K-means clustering technique is used. The method further comprises building a K-nearest neighbor (KNN)-graph using the language models, when a number of clusters for performing the clustering is unknown or detected automatically.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

The term "comprising" and variations thereof as used herein is used synonymously with the term "including" and variations thereof and are open, non-limiting terms.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for mining latent intentions from natural language inputs, the system comprising:
   a computing device that maintains a plurality of natural language inputs; and
   an analysis platform that uses a plurality of unsupervised and semi-supervised approaches to surface and organize a plurality of relevant user intentions from the plurality of natural language inputs, wherein the analysis platform comprises:
   a language models fine-tuning module;
   a K-nearest neighbor (KNN)-graph building module; and
   a clustering module.

2. The system of claim 1, wherein the language models fine-tuning module is configured to fine-tune a plurality of language models based on the plurality of natural language inputs.

3. The system of claim 1, wherein the language models fine-tuning module is configured to tokenize a plurality of labeled texts and unlabeled texts into a plurality of language models.

4. The system of claim 1, wherein the KNN-graph building module is configured to build a distributed KNN-graph.

5. The system of claim 1, wherein the clustering module comprises a clustering technique that requires a number of clusters to be known ahead of time, and a clustering technique that is graph-based that does not require the number of clusters to be known ahead of time.

6. The system of claim 1, wherein the clustering module is configured to perform clustering based on whether a number of clusters is known or unknown, wherein when the number of clusters is unknown, then a Louvain clustering technique is used, and when the number of clusters is known, then a K-means clustering technique is used.

7. The system of claim 1, wherein the clustering module is configured to perform clustering based on whether a number of clusters is predetermined or detected automatically, wherein when the number of clusters is detected automatically, then a Louvain clustering technique is used, and when the number of clusters is predetermined, then a K-means clustering technique is used.

8. The system of claim 1, further comprising an intention mining module.

9. The system of claim 8, wherein the intention mining module is configured to design and refine a plurality of Intelligent Virtual Assistants (IVAs) for customer service and sales support.

10. The system of claim 1, further comprising an output device that receives an output from the analysis platform and determines a plurality of latent intentions using the output.

11. An analysis platform stored on one or more computer-readable tangible storage media, the platform comprising:
    a language models fine-tuning module that fine-tunes a plurality of language models;
    a K-nearest neighbor (KNN)-graph building module that builds a distributed KNN-graph;
    a clustering module that comprises a K-means clustering technique and a Louvain clustering technique, wherein the clustering module is configured to perform clustering based on whether a number of clusters is known or unknown; and
    an intention mining module that mines a plurality of latent intentions from a plurality of natural language inputs and an output from the clustering module.

12. The analysis platform of claim 11, wherein the language models fine-tuning module fine-tunes a plurality of language models based on the plurality of natural language inputs.

13. The analysis platform of claim 11, wherein the intention mining module is configured to design and refine a plurality of Intelligent Virtual Assistants (IVAs) for customer service and sales support.

14. The analysis platform of claim 11, wherein when the number of clusters is unknown, then the Louvain clustering technique is used, and when the number of clusters is known, then the K-means clustering technique is used.

15. The analysis platform of claim 11, wherein when the number of clusters is detected automatically, then the Louvain clustering technique is used, and when the number of clusters is predetermined, then the K-means clustering technique is used.

16. A method for mining latent intentions from natural language inputs, the method comprising:

receiving a plurality of language models based on a plurality of natural language inputs;

fine-tuning the plurality of language models;

performing clustering using the plurality of fine-tuned language models; and determining a plurality of latent intentions based on results of the clustering;

wherein performing clustering comprises performing clustering based on whether a number of clusters is known or unknown, wherein when the number of clusters is unknown, then a Louvain clustering technique is used, and when the number of clusters is known, then a K-means clustering technique is used.

17. The method of claim 16, wherein fine-tuning the plurality of language models comprises encoding the plurality of language models and using a softmax classifier to fine-tune the plurality of language models.

18. The method of claim 16, further comprising building a K-nearest neighbor (KNN)-graph using the plurality of language models, when a number of clusters for performing the clustering is unknown or detected automatically.

19. A method for mining latent intentions from natural language inputs, the method comprising:

receiving a plurality of language models based on a plurality of natural language inputs;

fine-tuning the plurality of language models;

performing clustering using the plurality of fine-tuned language models; and determining a plurality of latent intentions based on results of the clustering;

wherein performing clustering comprises performing clustering based on whether a number of clusters is predetermined or detected automatically, wherein when the number of clusters is detected automatically, then a Louvain clustering technique is used, and when the number of clusters is predetermined, then a K-means clustering technique is used.

* * * * *